(12) United States Patent
Toya et al.

(10) Patent No.: US 7,764,043 B2
(45) Date of Patent: Jul. 27, 2010

(54) BATTERY CHARGER WITH INTERNAL BATTERY

(75) Inventors: Shoichi Toya, Minamiawaji (JP); Koichi Fukukawa, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 483 days.

(21) Appl. No.: 11/889,156

(22) Filed: Aug. 9, 2007

(65) Prior Publication Data

US 2008/0036417 A1 Feb. 14, 2008

(51) Int. Cl.
*H01M 10/46* (2006.01)
(52) U.S. Cl. ..................................................... 320/103
(58) Field of Classification Search ................. 320/101, 320/103, 107, 112, 114, 115, 134, 138, 150
See application file for complete search history.

(56) References Cited

U.S. PATENT DOCUMENTS

2005/0035740 A1* 2/2005 Elder et al. ................. 320/116
2005/0088141 A1* 4/2005 Lee et al. .................... 320/114

FOREIGN PATENT DOCUMENTS

| JP | 5-122858 | 5/1993 |
| JP | 11-136872 | 5/1999 |
| JP | 2003-199260 | 7/2003 |
| JP | 2006-204066 | 8/2006 |

OTHER PUBLICATIONS

English translation of JP 2003-199260, which was cited in the IDS filed Aug. 9, 2007.

* cited by examiner

*Primary Examiner*—Edward Tso
(74) *Attorney, Agent, or Firm*—Wenderoth, Lind & Ponack, L.L.P.

(57) ABSTRACT

A battery charger includes a first charging circuit controlling input power to charge an external battery detachably mounted to the charger; an internal secondary battery charged by the input power; a charge/discharge control circuit for charging the internal battery by the input power and controlling a charge of the internal battery; and a control circuit for controlling an operative state of the first charging circuit and the charge/discharge control circuit. The charger serves to charge the detachably mounted external battery both by the input power and by the power from the internal battery. The charger is so structured that when the input power is not in an inputted state, the control circuit supplies the electric power from the internal battery to the charge/discharge control circuit where an operative state of the internal battery is controlled, thus discharging the internal battery to charge the external battery.

13 Claims, 12 Drawing Sheets

BATTERY CHARGER WITH INTERNAL BATTERY

BACKGROUND OF THE INVENTION

1. Field of the Invention

The present invention relates to a battery charger for charging an external battery being detachably mounted to the charger, and particularly to a battery charger for charging the external battery by means of a lithium-ion secondary battery incorporated in the charger along with electric power from a commercial power supply or the like.

2. Description of the Related Art

The assignee of the present invention has previously developed a battery charger having a reserve battery incorporated for the purpose of shortening an involved charging time. (Refer to Japanese Laid-Open Patent Publication No. 2003-199260).

FIG. 1 shows a circuit diagram of a battery charger as disclosed in Japanese Laid-Open Patent Publication No. 2003-199260. The battery charger includes: an electrically charging source 92 for charging an external secondary battery 91; a main charge switch 94, interconnected to and between the charging source 92 and the external battery 91, for switching on and off the external batteries 91 to be charged in a mutually delayed timing of pulse charge; a reserve battery 96, connected through an auxiliary charge switch 95 to the charging source 92, for being charged by the charging source 92; a sub charge switch 97 connected to and between the reserve battery 96 and the external battery 91; and a control circuit 93 for controlling the switching on and off the sub charge switch 97, the main charge switch 94 and the auxiliary charge switch 95. The control circuit 93 switches on and off the main charge switch 94 to sequentially pulse-charge a plurality of external batteries 91, and also switches on the auxiliary charge switch 95 at a timing when the charging source 92 does not charge the external battery 91, so that the charging source 92 controls the charging of the reserve battery 96. Further, the control circuit 93 sequentially switches on and off the main charge switch 94, and in the pulse-charging timing that the external battery 91 is pulse-charged, the main charge switch 94 is switched off, and the main charge switch 94 is switched off to switch on the sub charge switch 97 connected to the external battery 91, which is not pulse-charged by the charging source 92, so that the external battery 91 is charged by means of the charging source 92 as well as the reserve battery 96.

The battery charger is able to charge a secondary battery within a shorter time period without increasing the amount of pulsed current for a pulse charge. This is because when a charging current is not supplied to the secondary battery from the charging source, or when a charging current smaller than set currents is supplied from the charging source to the secondary battery, the charging source supplies the charging current to an auxiliary battery to fully charge the auxiliary battery, so that the secondary battery is charged in a delayed timing both from the auxiliary charge current supplied from the charged reserve battery and from the pulsed-charging current supplied from the charging source. In particular, the battery charger is able to charge the external battery effectively within a shorter period of time, by delaying the timing of charging from the pulse charge and from the reserve battery, in other words, without increasing the amount of pulsed current for the pulse charge by charging the reserve battery in a timing of not pulse-charging. Since the battery charger is able to charge the external battery within a shorter period of time without increasing the amount of pulsed current for the pulse charge, a quick recharge becomes possible without increasing the output current from the charging source.

The assignee of the present invention has fabricated the battery charger as a charger for a nickel-hydrogen battery, a nickel-cadmium battery, etc. In the battery charger, the internal reserve battery is made of the same type as the external battery. This is because the reserve battery is connected via a diode to the external battery so that the external battery is charged from the reserve battery. Since the reserve battery and the external battery are of the same type in the battery charger, the external battery can be charged by the reserve battery connected to the external battery, without the external battery being subjected to an overcharge. However, the battery charger uses an internal reserve battery for the purpose of shortening the charging time needed for the external battery to be charged, that is to say, in order to increase an average current amount from the charging current. Further, an electric source for all the circuits in controlling the charge of the external battery is supplied by input power from a commercial power supply. As such, when the commercial power supply fails or becomes unavailable, the control circuit becomes inoperable, resulting in failure to charge the external battery by means of the reserve battery. Therefore, when a power plug is unplugged from the battery charger, the charge on the external battery comes to stop as well. For example, it may happen that the external battery during a charging operation is carried around when the battery is not yet in a fully charged state. In such a state as the power plug is unplugged, a conventional type of battery charger is unable to charge the external battery even when the reserve battery is already in a fully charged state.

The present invention has thus been made to solve the above-mentioned difficulties. It is the primary object of the invention to provide a battery charger which is able to charge continuously by means of an internal lithium-ion secondary battery, like when the power plug is unplugged to interrupt input power even while the external battery is not yet in a fully charged state.

It is another object of the invention to provide a battery charger, with a lithium-ion secondary battery being built inside, which is able to effectively charge the external battery by means of the internal lithium-ion secondary battery, even when the battery charger has not been used for a long period of time.

Further, another major object of the invention is to provide a battery charger, with a lithium-ion secondary battery being built inside, so that the internal battery is constantly kept in a fully charged state, and thus the external battery can be efficiently charged.

SUMMARY OF THE INVENTION

The inventive battery charger is structured to include the following components in order to achieve the above-described objects.

The battery charger includes a first charging circuit 2 for controlling input power to charge an external battery 1 which is detachably mounted to the battery charger; an internal secondary battery 3 which is charged by the input power; a charge/discharge control circuit 4 for charging the internal secondary battery 3 by the input power and controlling a discharge of the internal secondary battery 3; and a control circuit 5 for controlling an operative state of the first charging circuit 2 and the charge/discharge control circuit 4. The battery charger serves to charge the detachably mounted external battery 1 by means of the input power as well as by means of the internal secondary battery 3. The battery charger is so constructed and arranged that when the input power is not in a state of being input to the charger, the control circuit 5 supplies electric power from the internal secondary battery 3 to the charge/discharge control circuit 4 into an operative state, so that the charge/discharge control circuit 4 in its operative state controls a discharge state of the internal secondary battery 3, and thus the internal secondary battery 3 is discharged, so that the external battery 1 is charged by using the discharged electric power.

The above-described battery charger carries the advantage that even when the external battery is not in a state of being fully charged, with the input power being disrupted, the external battery can be charged. This is because the inventive battery charger is so structured as to incorporate an internal secondary battery which is charged by the input power, and the detachably mounted external battery is charged by means of the input power as well as by means of the internal secondary battery, so that when the input power is not inputted, the electric power from the internal secondary battery causes the charge/discharge control circuit to be operative and controls the discharge state of the internal secondary battery so as to charge the external battery by means of the discharged electric power from the internal secondary battery. The above-described battery charger has the feature that not only the secondary battery is contained for charging the external battery, but also the discharge state of the internal secondary battery is controlled to charge the external battery when the input power is disrupted, the power from the internal secondary battery causes the charge/discharge control circuit to be operative. Therefore, even when the input power is disrupted like when the power plug is unplugged during a charging operation, the external battery continues to be charged by the discharge power from the internal secondary battery. As such, the battery charger can be used very conveniently even when the battery charger has to be carried around when a user has only a limited time for charging the external battery by means of the input power, or when the user is mobile and without access to an input power supply.

The inventive battery charger is structured to have the charge/discharge control circuit 4 provided with a charge switch 11 which controls the charge of the external battery 1, and the charge switch 11 is able to control the state where the internal secondary battery 3 charges the external battery 1.

The above-described battery charger carries the advantage that, since the charge/discharge control circuit is equipped with the charge switch for controlling the charge of the external battery with which to control the state where the external battery is charged by the internal secondary battery, an operation of this charge switch facilitates a quicker recharge by means of the charging operation by the input power as well as by the charging operation of the external battery by means of the output power from the internal secondary battery.

The inventive battery charger can be provided with a DC-DC converter 7 for converting the output voltage from the internal secondary battery 3.

The inventive battery charger is provided with a main electric power source circuit 6 for outputting a DC voltage for charging the external battery 1, and the main electric power source circuit 6 can use input power from the commercial power supply 10.

The inventive battery charger is so constructed and arranged that the first charge circuit 2 is provided with a sub charging circuit 9 for charging the internal secondary battery 3 by supplying the electric power to the internal secondary battery 3 from the external battery 1, so that the sub charging circuit 9 enables the internal secondary battery 3 to be charged from the external battery 1.

The inventive battery charger is provided with a main electric power source circuit for outputting the DC voltage for charging the external battery 1, where the main electric power source circuit can be an AC adaptor 40.

The above-described battery charger, being provided with an AC adaptor to serve as a main electric power circuit for outputting the DC voltage for charging the external battery, does not need to be provided with a circuit for converting the commercial power supply to battery charging power, so that the battery charger can be simplified in its circuit structure, and be compact enough in its entirety.

The inventive battery charger is provided with a main electric power source circuit for outputting the DC voltage for charging the external battery 1, where the main electric power source circuit can be a solar battery 50.

The above-described battery charger, being provided with a solar battery to serve as a main electric power circuit for outputting the DC voltage for charging the external battery, is able to effectively use energy from a solar light, which is a natural energy source, so that the internal secondary battery can be charged by the input power from the solar battery, and the charger can further effectively charge the external battery by means of the charged, internal secondary battery. Since the battery charger, in particular, uses the output power from the solar battery as input power, a running cost can be reduced to effectively charge the external battery, and also in the case of a blackout or other kind of disaster, the battery charger carries the advantage of being conveniently used.

Further, the inventive battery charger can be so designed as to use a lithium-ion secondary battery as the internal secondary battery 3.

The above-described battery charger, with the lithium-ion secondary battery being incorporated as an internal secondary battery, is so structured as to charge the external battery by means of the lithium-ion secondary battery. When compared with a nickel-hydrogen battery and a nickel-cadmium battery, the lithium-ion secondary battery is smaller in its self-discharge, so that its fully charged state can last longer after being fully charged, even when input power is not inputted. As such, the battery charger is able to effectively charge the external battery by means of the lithium-ion secondary battery even when the charger is not being used for a long period of time, and also the charger is able to continue to be fully charged for the internal battery, so that the external battery can be effectively charged.

The above and further objects of the present invention as well as the features thereof will become more apparent from the following detailed description to be made in conjunction with the accompanying drawings.

DETAILED DESCRIPTION OF THE PREFERRED EMBODIMENT(S)

Figure 1:
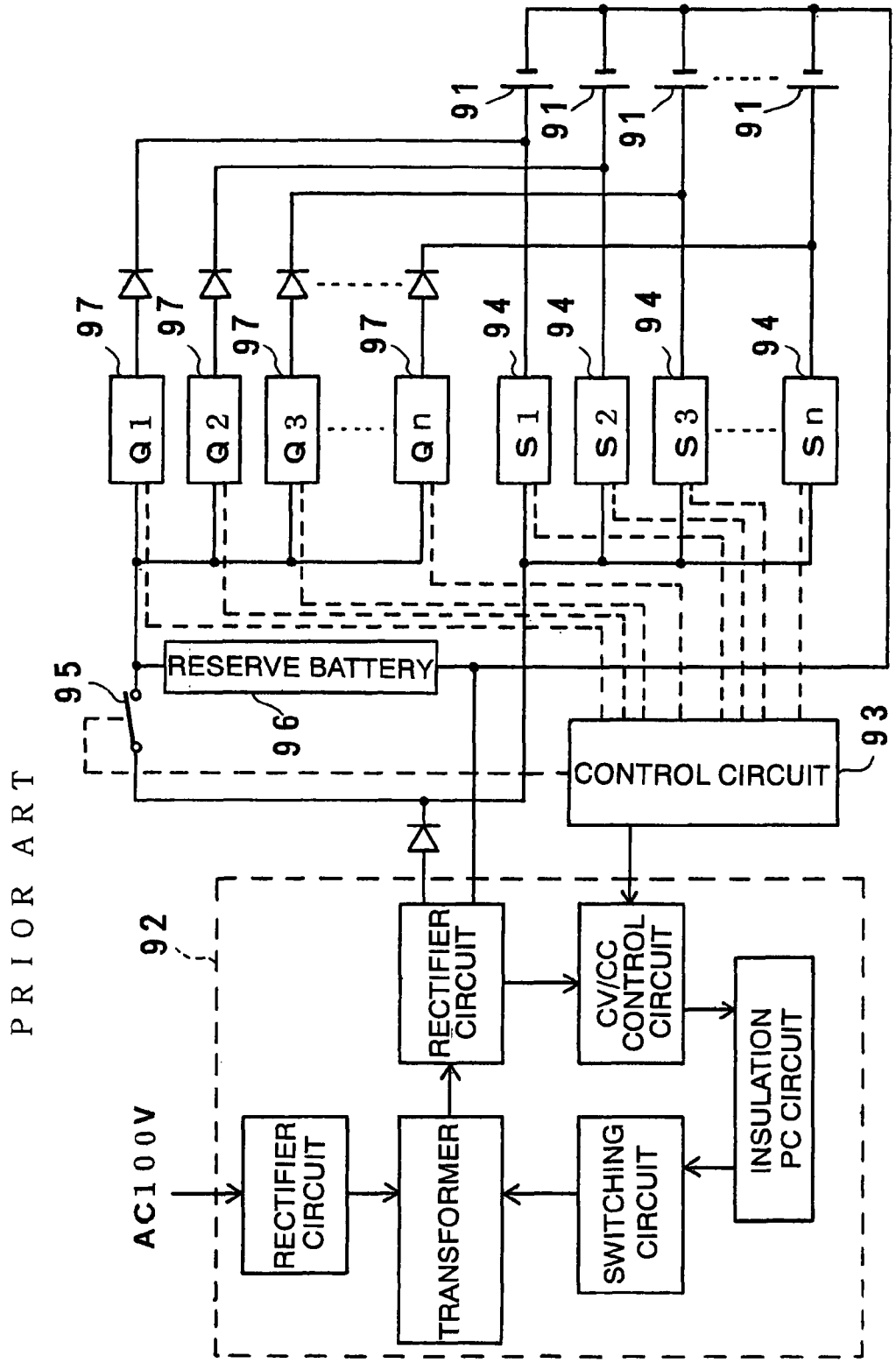
FIG. 1 is a circuit diagram showing a battery charger which has previously been applied by the assignee of the present invention.

A battery charger shown in FIG. 2 through FIG. 7 has a casing 21, 31 provided with an electronic device incorporated with an external battery, or with a mounting portion 22, 32 to which an external battery 1 is detachably mounted. The casing 21, 31 is incorporated with an internal secondary battery 3 for charging the external battery 1. The illustrated internal secondary battery 3 is a lithium-ion secondary battery. It should be noted, however, the inventive battery charger is not limited to a lithium-ion secondary battery as an internal secondary battery. The internal secondary battery may be any other rechargeable kind of battery such as a nickel-hydrogen battery and a nickel-cadmium battery. The illustrated battery charger is also provided with a power plug 23, 33 which is connected to a plug socket from a commercial power supply for charging the external battery 1 and the internal secondary battery 3.

Figure 2:
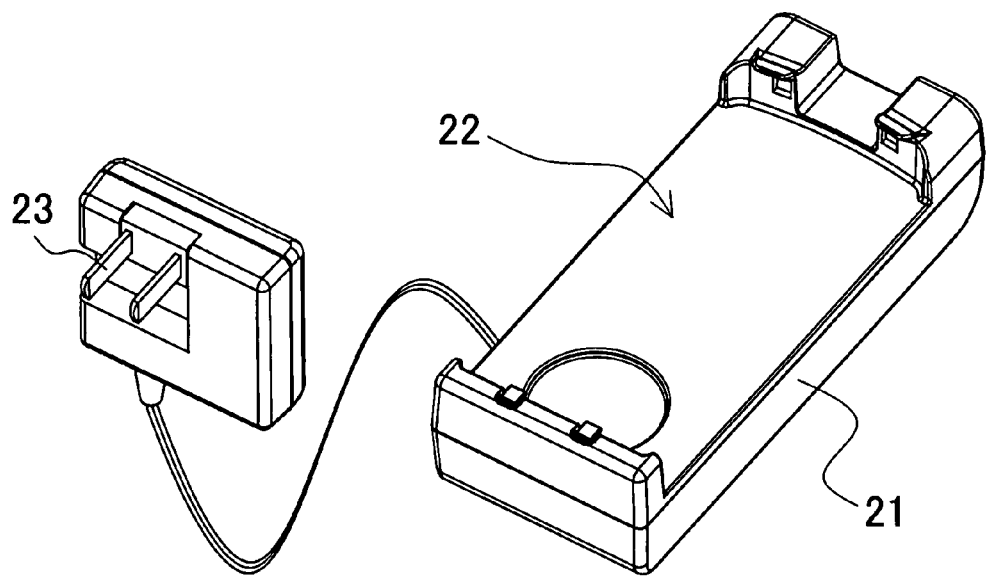
FIG. 2 is a perspective view of the battery charger in accordance with an embodiment of the present invention.
Figure 3:
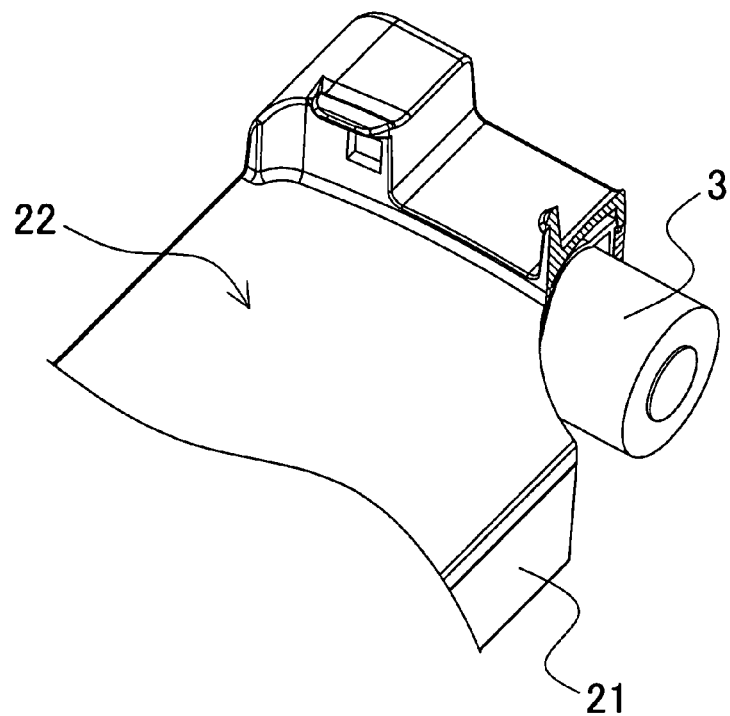
FIG. 3 is a partial, cross sectional, perspective view of the battery charger as shown in FIG. 2.
Figure 4:
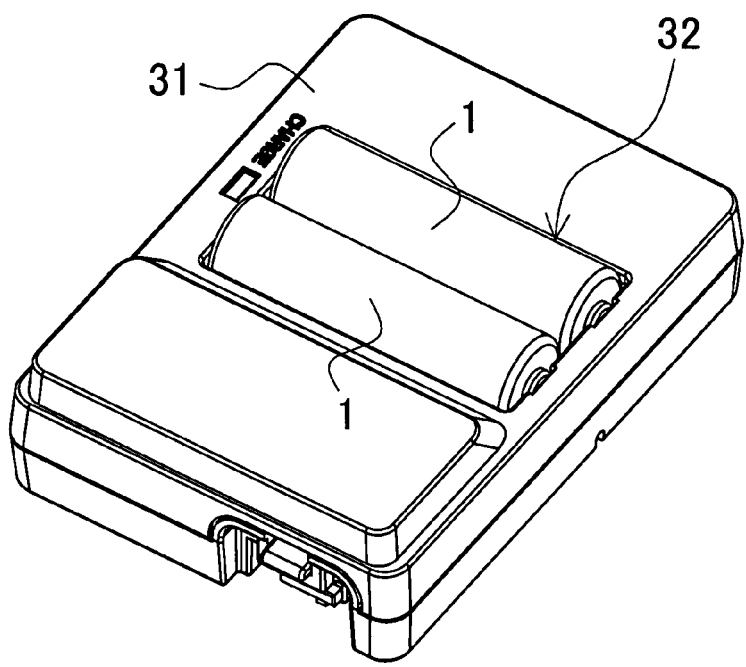
FIG. 4 is a perspective view of the battery charger in accordance with an alternative embodiment of the present invention.
Figure 5:
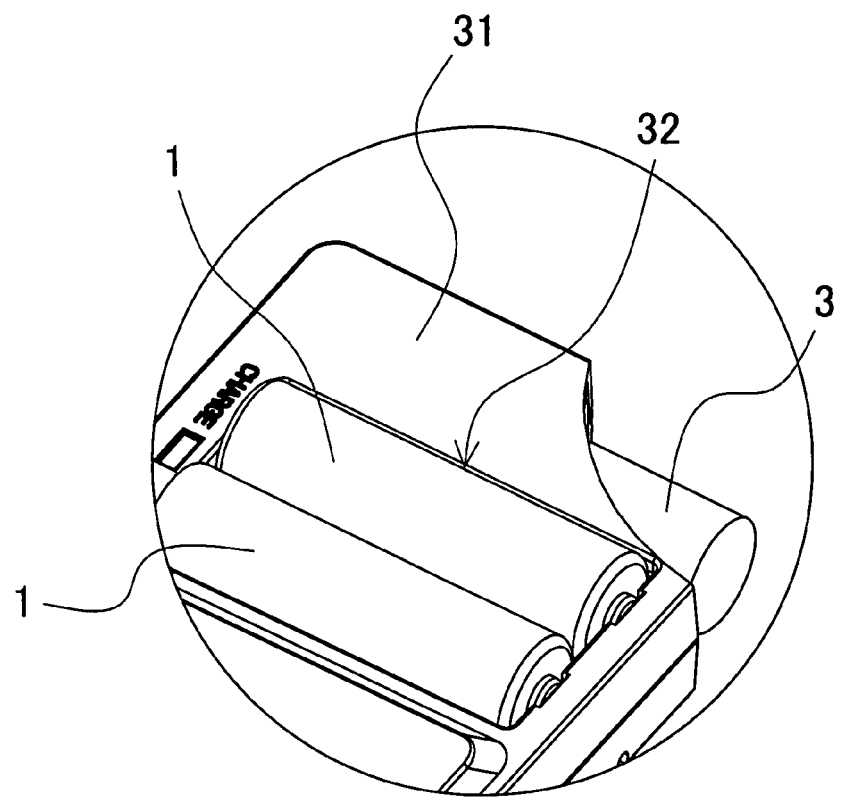
FIG. 5 is a partial, cross sectional, perspective view of the battery charger shown in FIG. 4.
Figure 6:
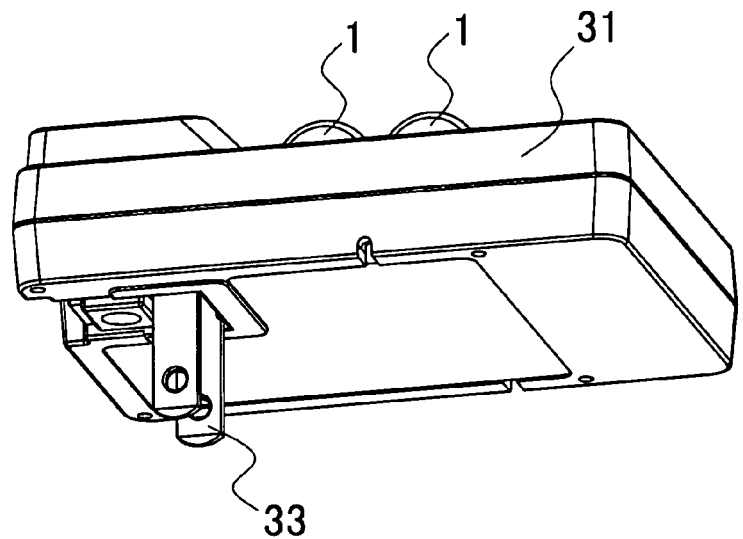
FIG. 6 is a bottom perspective view of the battery charger shown in FIG. 4.
Figure 7:
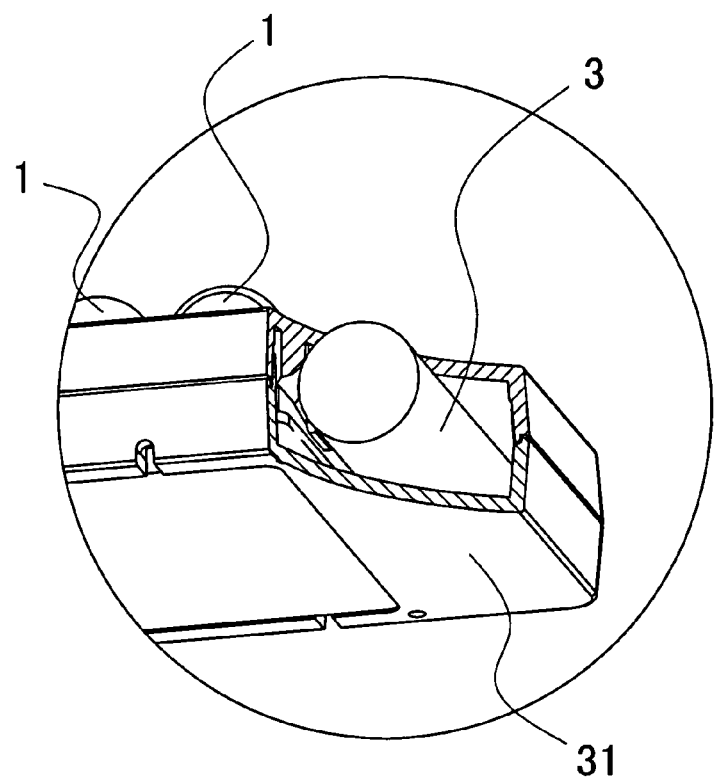
FIG. 7 is a partial, cross sectional, perspective view of the battery charger shown in FIG. 6.

In the battery charger shown in FIGS. 2 and 3, a mounting portion 22 for detachably mounting a mobile electronic device (not shown) such as a mobile phone is provided on the upper face of the casing 21. In a state where the mobile electronic device is mounted to the mounting portion 22, the battery charger serves to charge either an external battery which is a secondary battery built in a mobile electronic device, or an external battery which is a secondary battery incorporated in a battery pack which is detachably mounted to the mobile electronic device. In the battery charger shown in FIG. 4 through FIG. 7 as well, a mounting portion 32 for detachably mounting an AA size secondary battery is provided on the top surface. The battery charger charges the external battery 1 which is a secondary battery mounted to the mounting portion 32. Further, although not shown, the battery charger can also mount a battery pack, detachably mounted to the mounting portion, on a device such as a mobile electronic device, so that the external battery can also be charged, which is a secondary battery built in the battery pack.

In these battery chargers, the external battery 1 directly or indirectly mounted to the mounting portion 22, 32 is charged by means of input power from a commercial power supply as well as by means of the internal secondary battery 3 which is built in the casing 21, 31. In particular, when the commercial power supply is not input, namely, when input power is not in an inputted state, the external battery 1 is charged by means of the internal secondary battery 3. The external battery 1, which is mounted to the mounting portion 22, 32 to be charged, is a lithium-ion secondary battery. However, the external battery may also be a rechargeable secondary battery such as a nickel-hydrogen battery and a nickel-cadmium battery.

Figure 8:
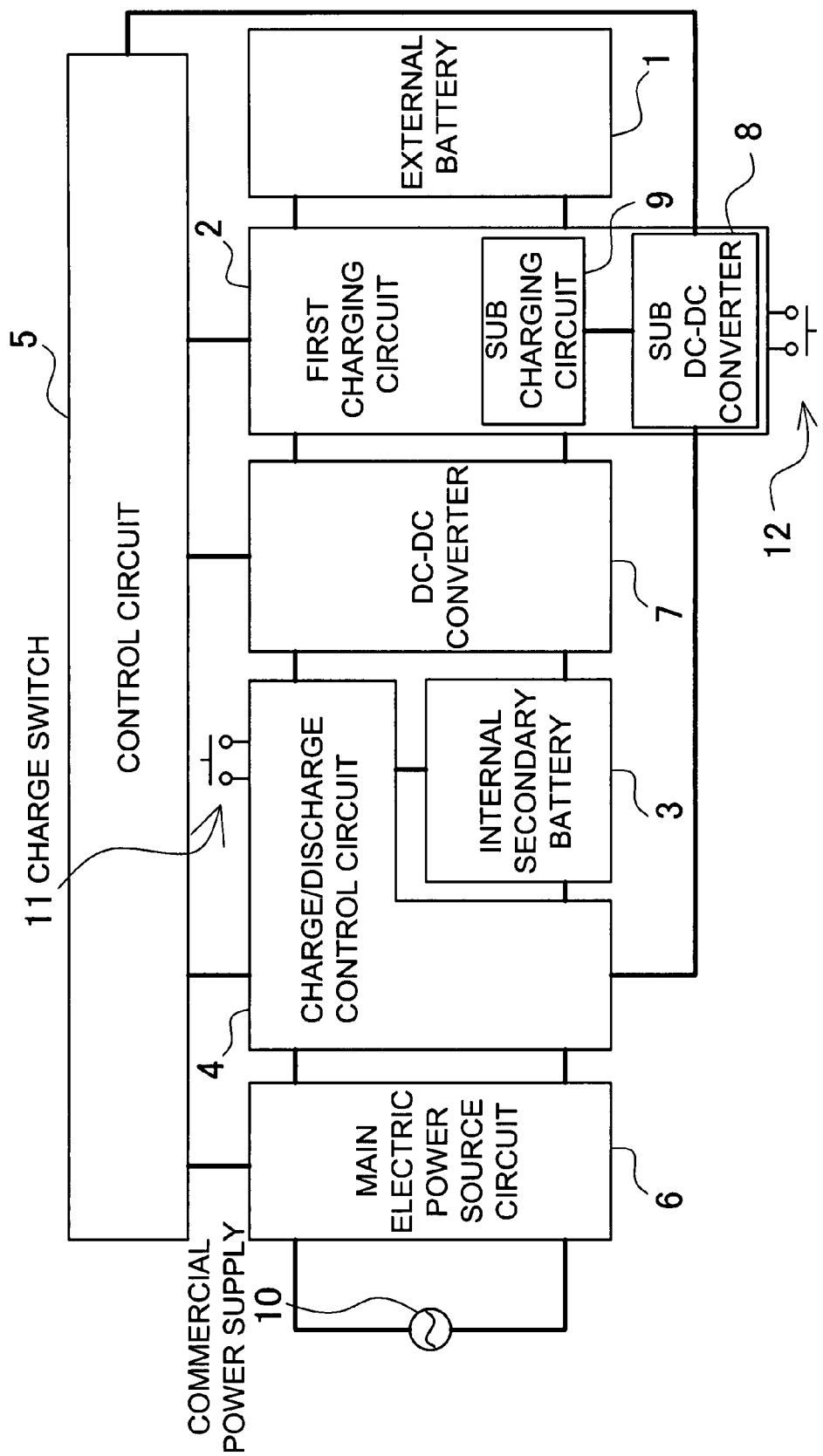
FIG. 8 is a block diagram showing the battery charger in accordance with an embodiment of the present invention.

FIG. 8 is a block diagram of the battery charger shown in these drawings. The battery charger shown in the block diagram includes a first charging circuit 2 for charging the detachably mounted external battery 1; an internal secondary battery 3 which is charged by the input power; a charge/discharge control circuit 4 for charging the internal secondary battery 3 by means of the input power as well as for controlling the charge of the internal secondary battery 3; and a control circuit 5 for controlling the operative state of the first charging circuit 2 and the charge/discharge control circuit 4. Further, the battery charger includes a main power source circuit 6 for outputting a DC voltage for charging the external battery 1. In the illustrated battery charger, since the input power is from the commercial power supply 10, the main power source circuit 6 is set to be a circuit for converting the AC 100 V from the commercial power supply 10 to DC voltage. However, the inventive battery charger does not necessarily have to utilize input power from a commercial power supply. As will be described later in detail, it is also possible to provide a main power source circuit for supplying DC input power. The illustrated battery charger is also provided with a DC-DC converter 7 for converting the output voltage from the internal secondary battery 3. Further, the first charging circuit 2 is provided with a sub DC-DC converter 8 for converting the output voltage from the external battery 1 to the charging voltage from the internal secondary battery 3, as well as with a sub charging circuit 9 for controlling the state where the external battery 1 charges the internal secondary battery 3.

The first charging circuit 2 controls the charge of the external battery 1, and stops the charging operation when the external battery 1 becomes fully charged. The first charging circuit 2 charges the external battery 1 by controlling both the input power, which is inputted from the main power source circuit 6, and the electric power outputted from the internal secondary battery. In a state where the electric power is inputted from the commercial power supply 10, the first charging circuit 2 charges the external battery 1 by means of the output power from the main electric power source circuit 6. At this state, when the internal secondary battery 3 still has a residual capacity for charging the external battery 1, the control circuit 5 charges the external battery 1 by the electric power both from the main electric power source circuit 6 and the internal secondary battery 3. Further, when the power plug is unplugged from a plug socket, or when the commercial power supply 10 does not supply the electric power, the control circuit 5 starts to charge the external battery 1 by using the internal secondary battery 3. However, when the residual capacity of the internal secondary battery 3 reaches a capacity that is unable to charge the external battery 1, in other words, when the internal secondary battery 3 is in a completely discharged state, the control circuit 5 does not charge the external battery 1 from the internal secondary battery 3. In this state, the external battery 1 is charged only by means of the output power from the main electric power source circuit 6.

The lithium-ion secondary battery as the internal secondary battery 3 is charged either by the input power or by the external battery 1. The lithium-ion secondary battery charged by the input power is fully charged by the charge/discharge control circuit 4. The lithium-ion secondary battery is charged at a constant current to reach a set voltage, and subsequently is charged at a constant voltage to become fully charged. When charged at a constant voltage, the charging current decreases while reaching a full charge. Therefore, when the charging current becomes smaller than a set current, it is judged that the lithium-ion secondary battery has reached a full charge and the charge is stopped. Since the lithium-ion secondary battery is fully charged by charging at a constant voltage, a longer time is needed for a full charge when compared with a battery that is fully charged at a constant current like a nickel-hydrogen battery or nickel-cadmium battery. However, the lithium-ion secondary battery cannot be disadvantageous in that the charging time is longer. This is because the lithium-ion secondary battery is charged in a state where the battery charger is connected to the commercial power supply 10. Further, the lithium-ion secondary battery is smaller in its self discharge when compared with the nickel-hydrogen battery and nickel-cadmium battery. For this reason, after the lithium-ion secondary battery has been fully charged by means of the input power, the lithium-ion secondary battery is maintained in a fully charged state for a longer period of time, even when the commercial power supply 10 is not input to the battery charger. The lithium-ion secondary battery at full charge can increase the charging capacity of the external battery 1.

The charge/discharge control circuit 4 controls the charge of the lithium-ion secondary battery, which is an internal secondary battery 3, and stops the charging operation when over-charged. Further, the charge/discharge control circuit 4 continues to charge the lithium-ion secondary battery at a constant current until the battery voltage reaches a set voltage, and subsequently, fully charges at a constant voltage. When the lithium-ion secondary battery is fully charged, the charging operation stops. Further, the charge/discharge control circuit 4 controls the state of charging the lithium-ion secondary battery, which is the internal secondary battery 3, in other words, controls the state where the lithium-ion secondary battery charges the external battery 1. This is for the purpose of preventing the lithium-ion secondary battery from being over-discharged. The charge/discharge control circuit 4 continues to charge the external battery 1 by discharging the residual capacity of the lithium-ion secondary battery until its capacity reaches zero. When the lithium-ion secondary battery has no residual capacity, the charging operation is stopped to prevent the lithium-ion secondary battery from being over-discharged.

Figure 9:
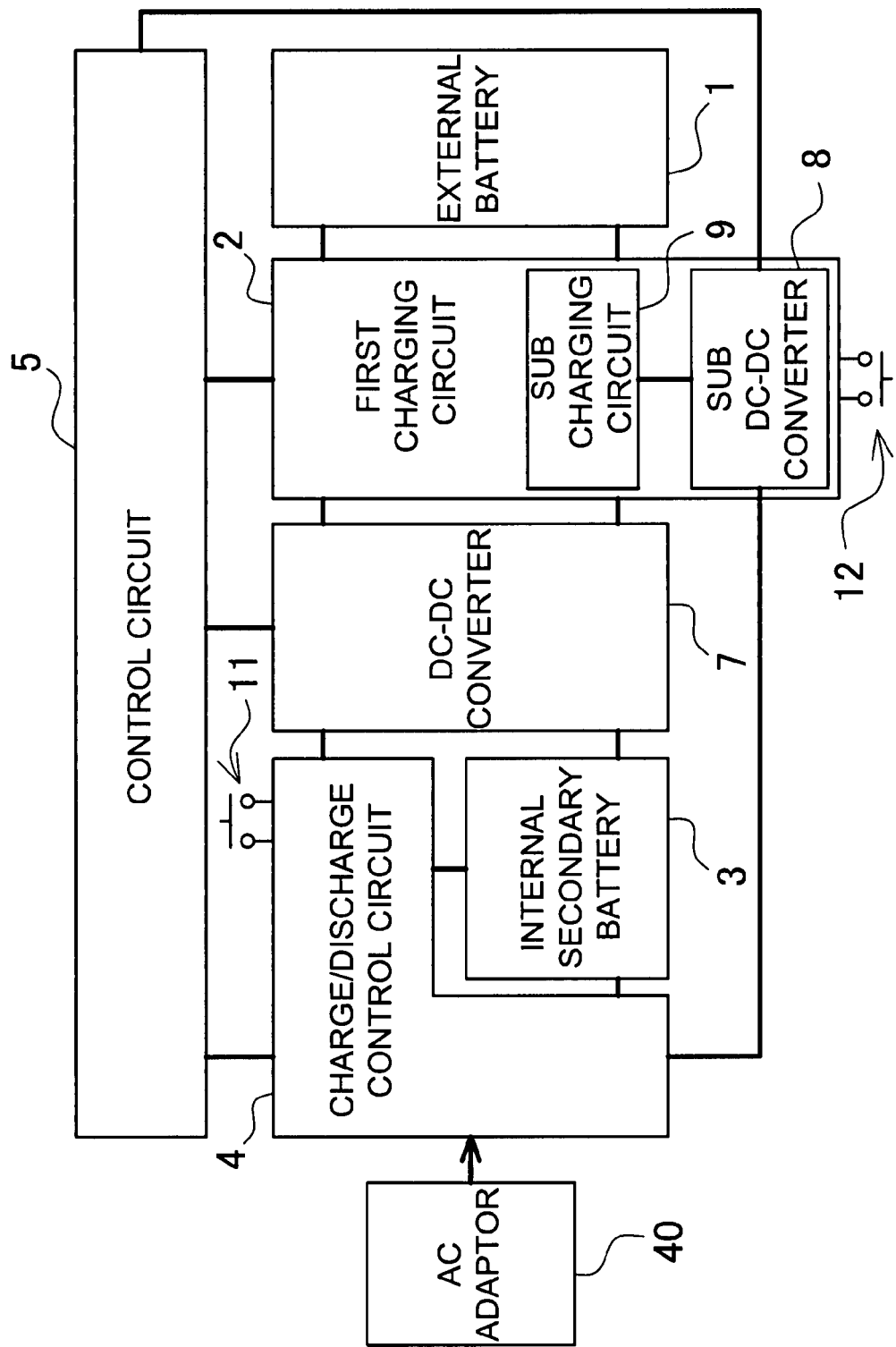
FIG. 9 is a block diagram showing the battery charger in accordance with an alternative embodiment of the present invention.

In the above-described battery charger, the input power is from the commercial power supply 10, the power supplied from which is converted by the main power source circuit 6 to the DC voltage for charging the external battery1 so as to be supplied to the charge/discharge control circuit 4. However, as shown in FIG. 9, the inventive battery charger can also be provided with the AC adaptor 40 to serve as a main electric power source circuit for outputting a DC voltage for charging the external battery 1. The battery charger supplies, to the charge/discharge control circuit 4, the DC power that is supplied from the AC adaptor 40. Since the battery charger does not have to be provided with a circuit for converting the commercial power supply to the DC voltage for charging the external battery 1, the circuit structure can be advantageously simplified resulting in a smaller size of battery charger.

Figure 10:
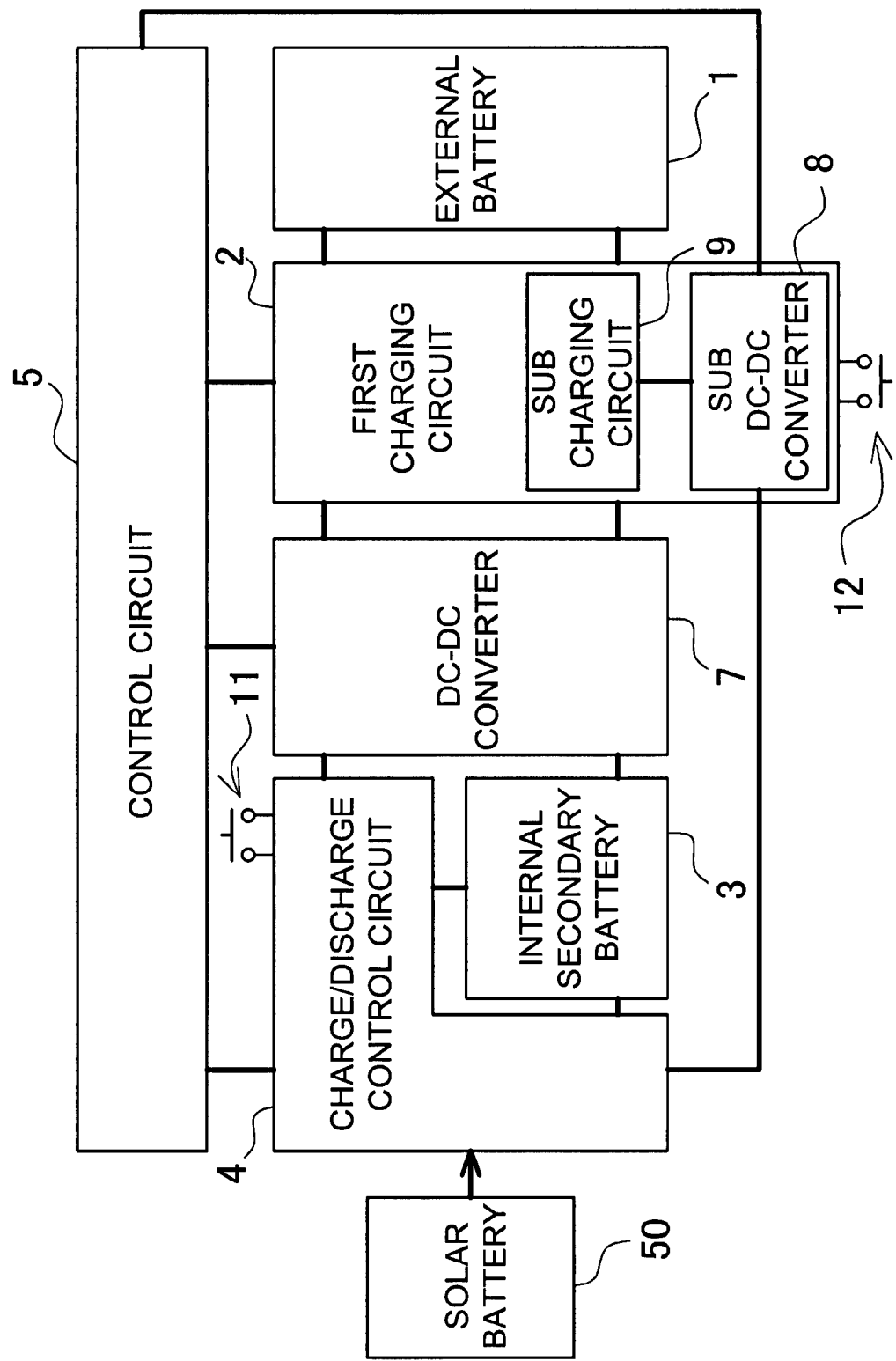
FIG. 10 is a block diagram showing the battery charger in accordance with another embodiment of the present invention.

Further, the battery charger shown in FIG. 10 is provided with a solar battery 50 which serves as a main power source circuit for outputting a DC voltage for charging the external battery 1. The solar battery 50, although not shown, is disposed in the casing of the battery charger and supplies the DC power to the charge/discharge control circuit 4. However, when the residual capacity of the external battery is less than the set capacity, and when the power capacity by the solar battery is larger than the set capacity, the external battery can also be charged directly by the input power from the solar battery.

As described above, the battery charger to which the electric power is supplied from the solar battery 50 preferably incorporates the lithium-ion secondary battery as an internal secondary battery 3. The battery charger carries the following advantages when compared with the structure incorporating, the nickel-hydrogen battery or nickel-cadmium battery as an internal secondary battery. When the nickel-hydrogen battery or nickel-cadmium battery is used as an internal second battery, the charging efficiency decreases in a case where the charging current value is less than 1/20 C. The lithium-ion secondary battery, on the other hand, does not undergo such a decrease in charging efficiency. Therefore, in the case of a solar battery being used as a power supply source, even when a less sufficient current is available due to cloudy weather, the lithium-ion secondary battery can be charged efficiently without any decrease in the charging efficiency.

In the case of a battery charger where the output power from the solar battery 50 is used as input power and also where the lithium-ion secondary battery is used as an internal secondary battery, during the period of using the external battery 1 (for example, for three to seven days), the lithium-ion secondary battery as an internal secondary battery 3 is electrically charged to store electric power, and during the period of the external battery 1 being charged by the charged internal secondary battery 3, the charging operation can be performed within the shortest period (for about five hours). In the case of a nickel-hydrogen battery, on the other hand, the charging efficiency is decreased at a low rate (less than 1/20 C) and a charging operation is impossible when the electromotive force is not sufficient. Further, when the nickel-hydrogen battery is directly charged by a solar battery, the charging current is found to be less uniform and discontinuous, so that it becomes problematic in that a full charge cannot be detected. This is because the nickel-hydrogen battery is charged at a lower current and the charging operation is stopped by detecting a variation of voltage (detection of $-\Delta V$ (a voltage drop)) to detect the full charge. Instead, the lithium-ion secondary battery is charged at a lower voltage, without having to detect a full charge, so that the charging operation can be securely performed even from a solar battery with an unstable current value. Further, it is also possible to add another function such as charging a mobile phone by using the lithium-ion secondary battery. As described above, in the case of a battery charger where a solar battery with unstable output power is used as the input power, the structure of using the lithium-ion secondary battery as an internal secondary battery is found extremely effective and advantageous in that the charging efficiency is not decreased, thereby ensuring an efficient charging operation.

In the battery charger as embodied above, the control circuit 5 controls the operative state of the first charging circuit 2 and the charge/discharge control circuit 4. FIG. 11 through FIG. 15 show the state in which the control circuit 5 controls the first charging circuit 2 and the charge/discharge control circuit 4. However, the operative state depicted below shows the state of controlling the battery charger shown in FIG. 8. Here, in each drawing, the dotted line depicts the electrical connection line which is not in use.

First Operative State

Figure 11:
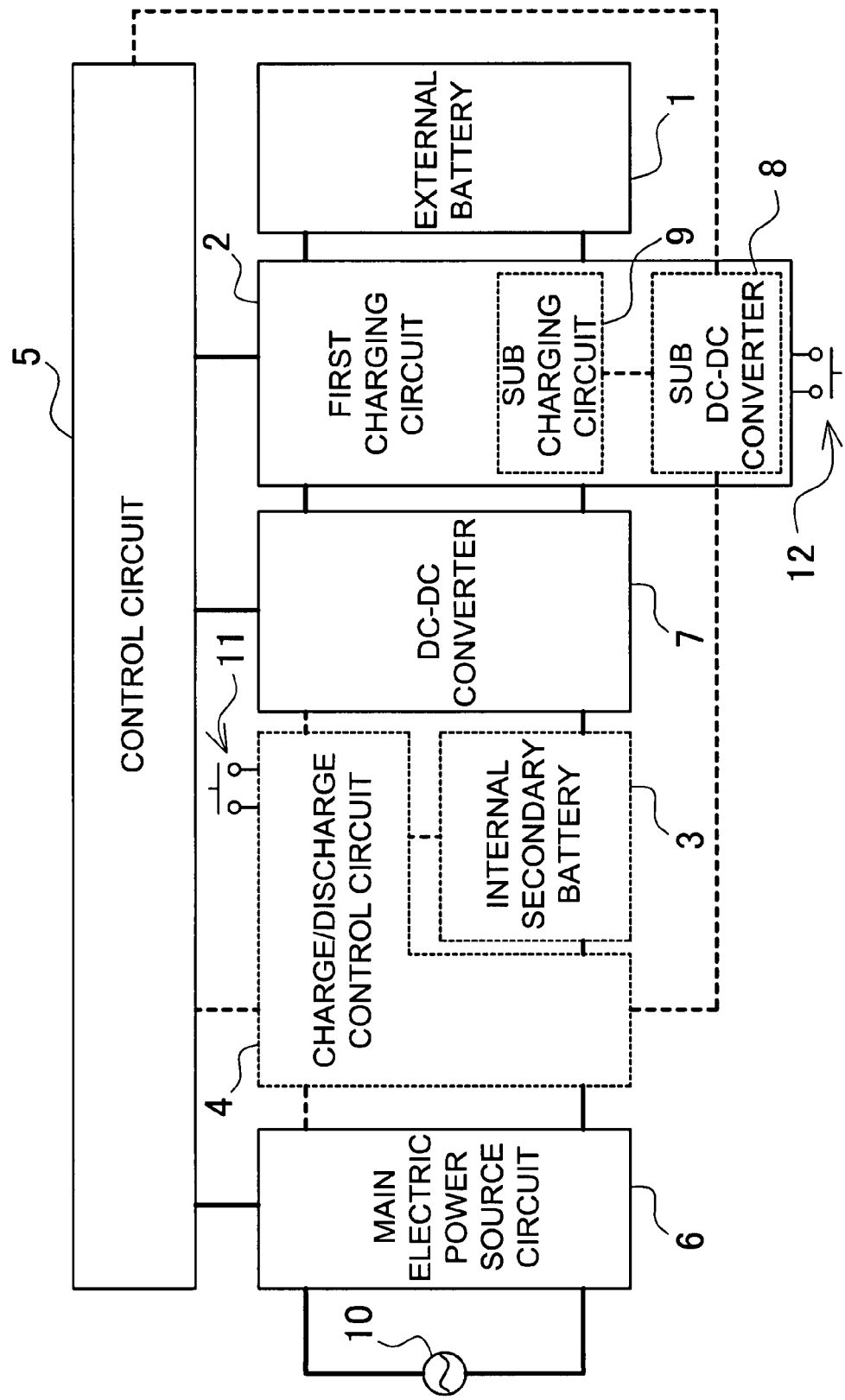
FIG. 11 is a view showing a first operative state of the battery charger shown in FIG. 8.

FIG. 11 shows the state where the commercial power supply 10 is supplied to the charger, which is the state where the first charging circuit 2 is charging the external battery 1 by means of the output power from the main electric power source circuit 6. This state shows the state in which the external battery 1 is charged when the residual capacity is small in the lithium-ion secondary battery as the internal secondary battery 3. The control circuit 5 detects the residual capacity of the internal secondary battery 3, and when the residual capacity of the internal secondary battery 3 is smaller than the set capacity, the first charging circuit 2 alone is made operative, instead of the charge/discharge control circuit 4 being made operative. The inoperative charge/discharge control circuit 4 does not charge the external battery 1 by means of the internal secondary battery 3, while the operative first charging circuit 2 charges the external battery 1 by means of the electric power supplied from the main electric power source circuit 6.

Second Operative State

Figure 12:
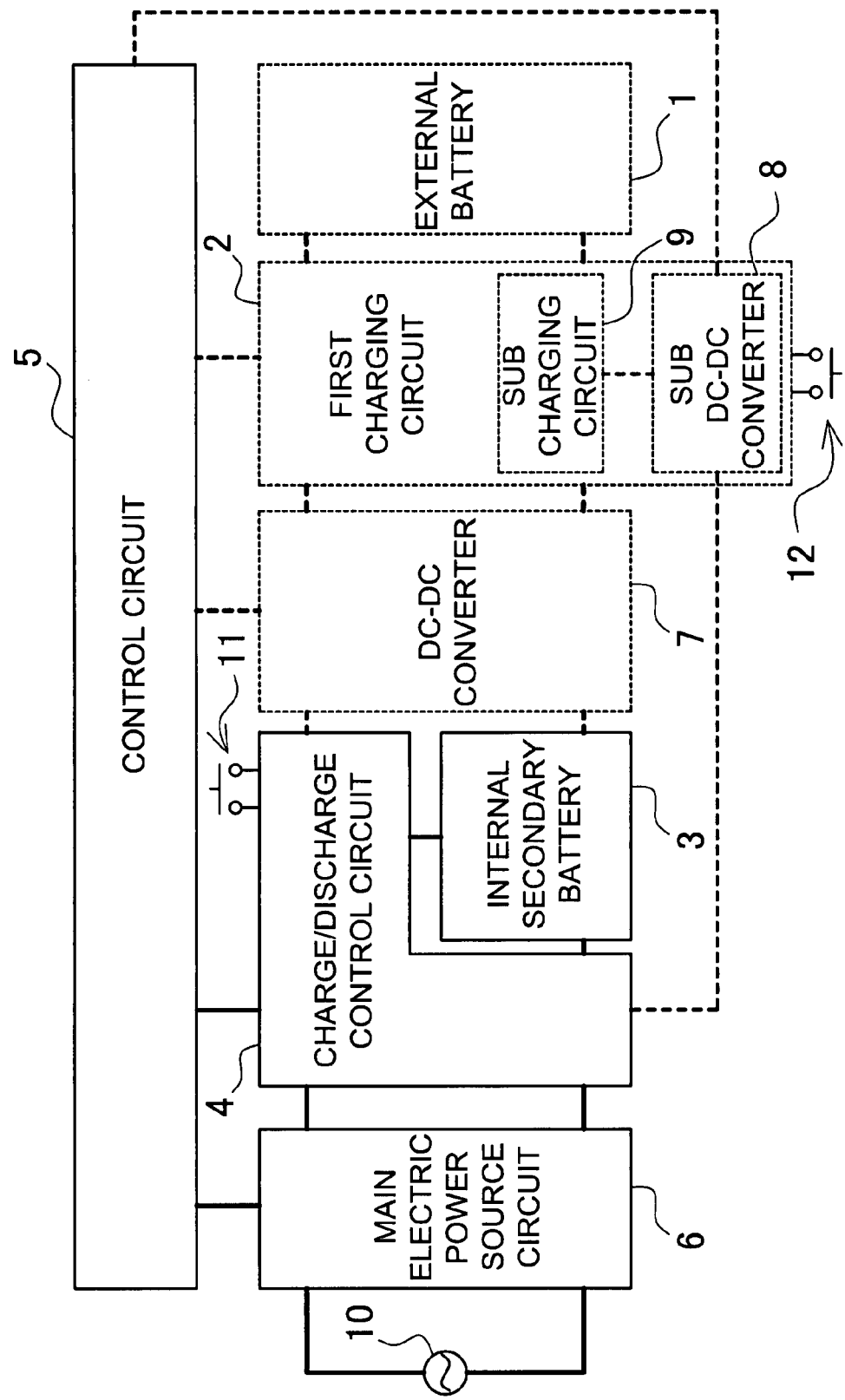
FIG. 12 is a view showing a second operative state of the battery charger shown in FIG. 8.

In FIG. 12, the internal secondary battery 3 is charged by means of the commercial power supply 10. That is, the lithium-ion secondary battery as the internal secondary battery 3 is charged by means of the electric power from the main electric power source circuit 6. This state is the state where the battery charger is connected to the commercial power supply 10 and the external battery 1 is not mounted to the battery charger, or the state where the external battery 1 is fully charged. The control circuit 5 detects the residual capacity of the internal secondary battery 3, and when the internal secondary battery 3 is not fully charged, the external battery 1 is detected not to have been charged, so that the charge/discharge control circuit 4 is made operative to charge the internal secondary battery by means of the electric power from the main electric power source circuit 6. When the internal secondary battery 3 is fully charged, the charge/discharge control circuit 4 stops the charging operation of the internal secondary battery 3. In such a state, the internal secondary battery 3 is fully charged.

Third Operative State

Figure 13:
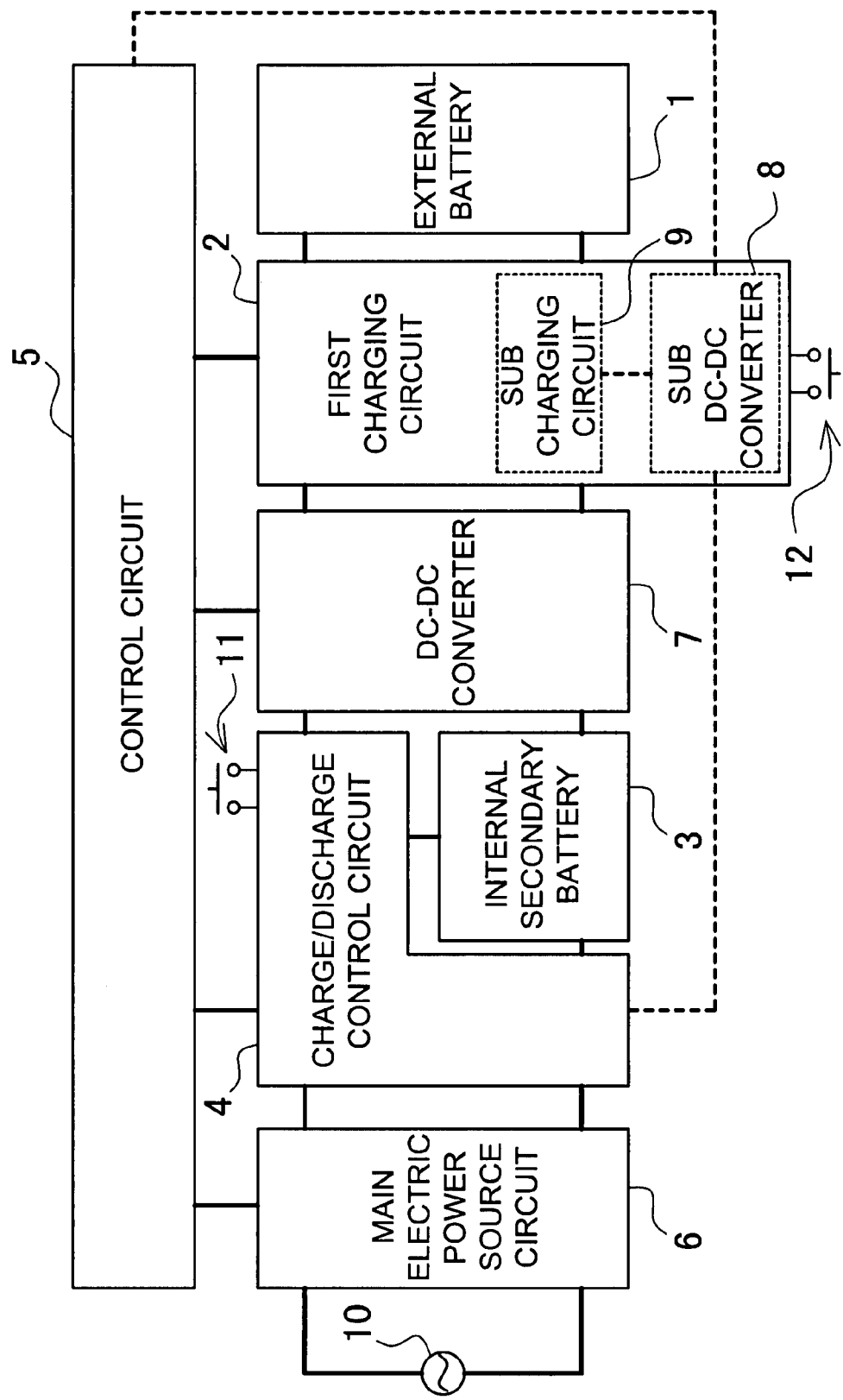
FIG. 13 is a view showing a third operative state of the battery charger shown in FIG. 8.

FIG. 13 shows the state where the external battery 1 is charged by the commercial power supply 10 as well as by the internal secondary battery 3. The state is the state where the battery charger is connected to the commercial power supply 10 for the electric power to be input from the commercial power supply 10, and the internal secondary battery 3 is charged up to the capacity that can be charged to the external battery 1. The control circuit 5 detects that the commercial power supply 10 is inputted and also detects that the residual capacity of the internal secondary battery 3 is larger than the capacity (the set capacity as described above) which can be charged to the external battery 1, so that the first charging circuit 2 and the charge/discharge control circuit 4 are made operative. The first charging circuit 2 in its operative state charges the external battery 1 by means of the output power from the main electric power source circuit 6. Further, the charge/discharge control circuit 4 in its operative state charges the internal secondary battery 3, and supplies the discharge energy of the internal secondary battery 3 to the external battery 1 to charge the external battery 1. In this state, the control circuit 5 also makes the DC-DC converter 7 operative, which is connected to the output side of the internal secondary battery 3, and thus the DC-DC converter 7 converts the output voltage from the internal secondary battery 3 to a voltage for charging the external battery 1, so that the external battery 1 is charged. This operative state can also be controlled by using the charge switch 11 provided to the charge/discharge control circuit 4. The charge/discharge control circuit 4 detects that the charge switch 11 is pushed so as to discharge the internal secondary battery 3 and to charge the external battery 1. The charge switch 11, for example, as a turbo-charge switch, charges the external battery 1 in a quicker time by means of the output power from the internal secondary battery 3 in addition to the main electric power source circuit 6. The charge/discharge control circuit without being provided with a charge switch detects that the internal secondary battery has a residual capacity that can charge the external battery, so that the external battery is charged.

Fourth Operative State

Figure 14:
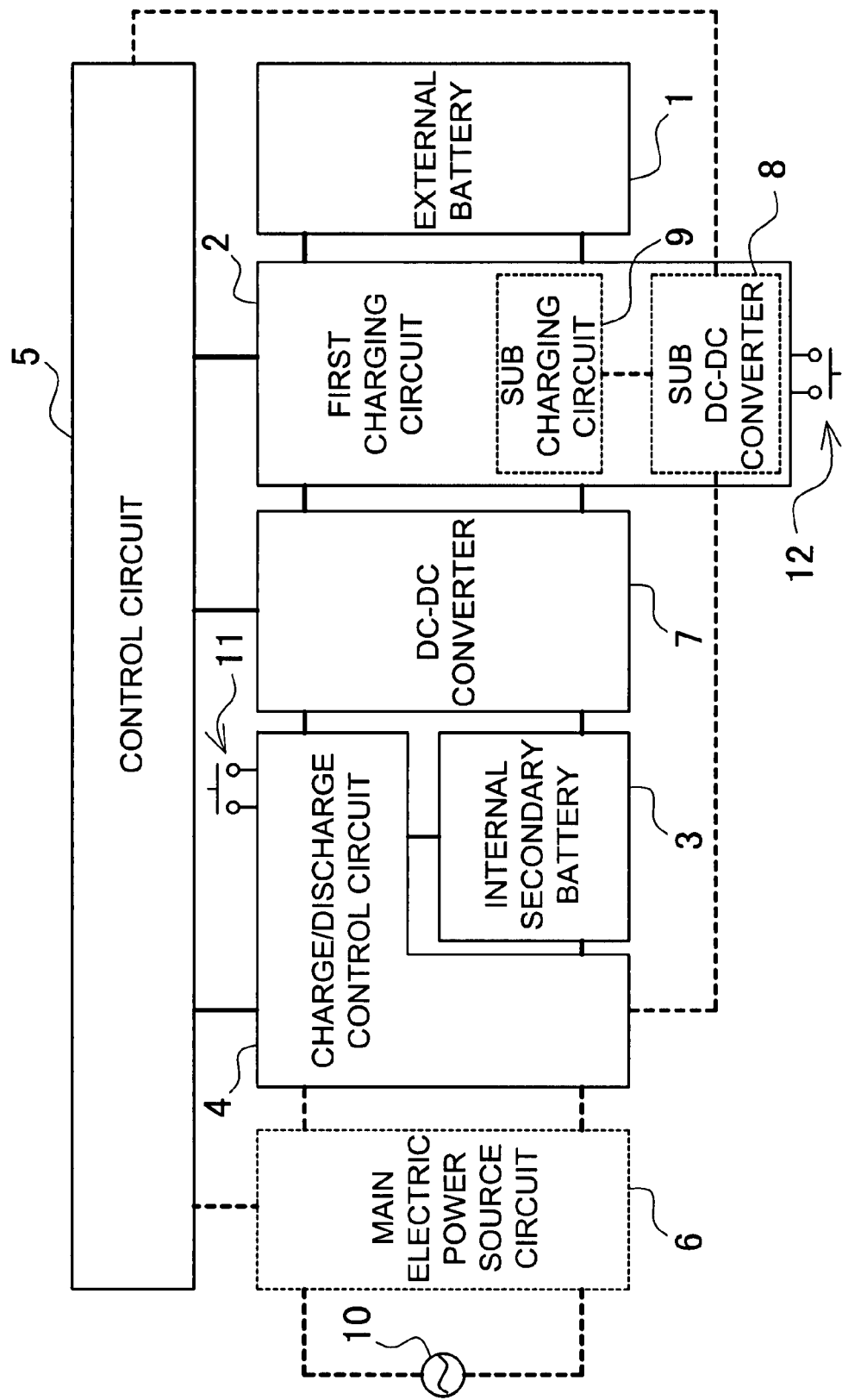
FIG. 14 is a view showing a fourth operative state of the battery charger shown in FIG. 8.

FIG. 14 shows the state in which the battery charger is not connected to the commercial power supply 10, and the internal secondary battery 3 charges the external battery 1. In the control circuit 5, when the commercial power supply 10 is not detected not to be inputted, and when the residual capacity of the internal secondary battery 3 is larger than the capacity that the external battery 1 can be charged, the first charging circuit 2 and the charge/discharge control circuit 4 are made operative instead of making the main electric power source circuit 6 operative; and thus the external battery 1 is charged by the internal secondary battery 3. In this state, the control circuit 5 also makes the DC-DC converter 7 operative and the DC-DC converter 7 is used to convert the output voltage from the internal second battery 3 to the charging voltage of the external battery 1, so that the external battery 1 is charged. In this state, when the external battery 1 is fully charged, the control circuit 5 stops the charging operation of the external battery 1. In the state as shown in FIG. 14, for example, when the battery charger is connected to the commercial power supply 10, and the external battery 1 is being charged by the commercial power supply 10 as well as by the internal secondary battery 3, the situation occurs that the battery charger is unplugged from the commercial power supply 10. Even if unplugged from the commercial power supply 10, the battery charger, which allows the internal secondary battery 3 to continue to charge the external battery 1, is able to continue to charge the external battery 1; even when the battery charger to which the external battery 1 is mounted, without being fully charged, is carried away from the commercial power supply 10, the external battery 1 can continue to be charged Such a state is conveniently utilized when there is not much time for charging the external battery 1 and the battery charger has to be carried away.

Fifth Operative State

Figure 15:
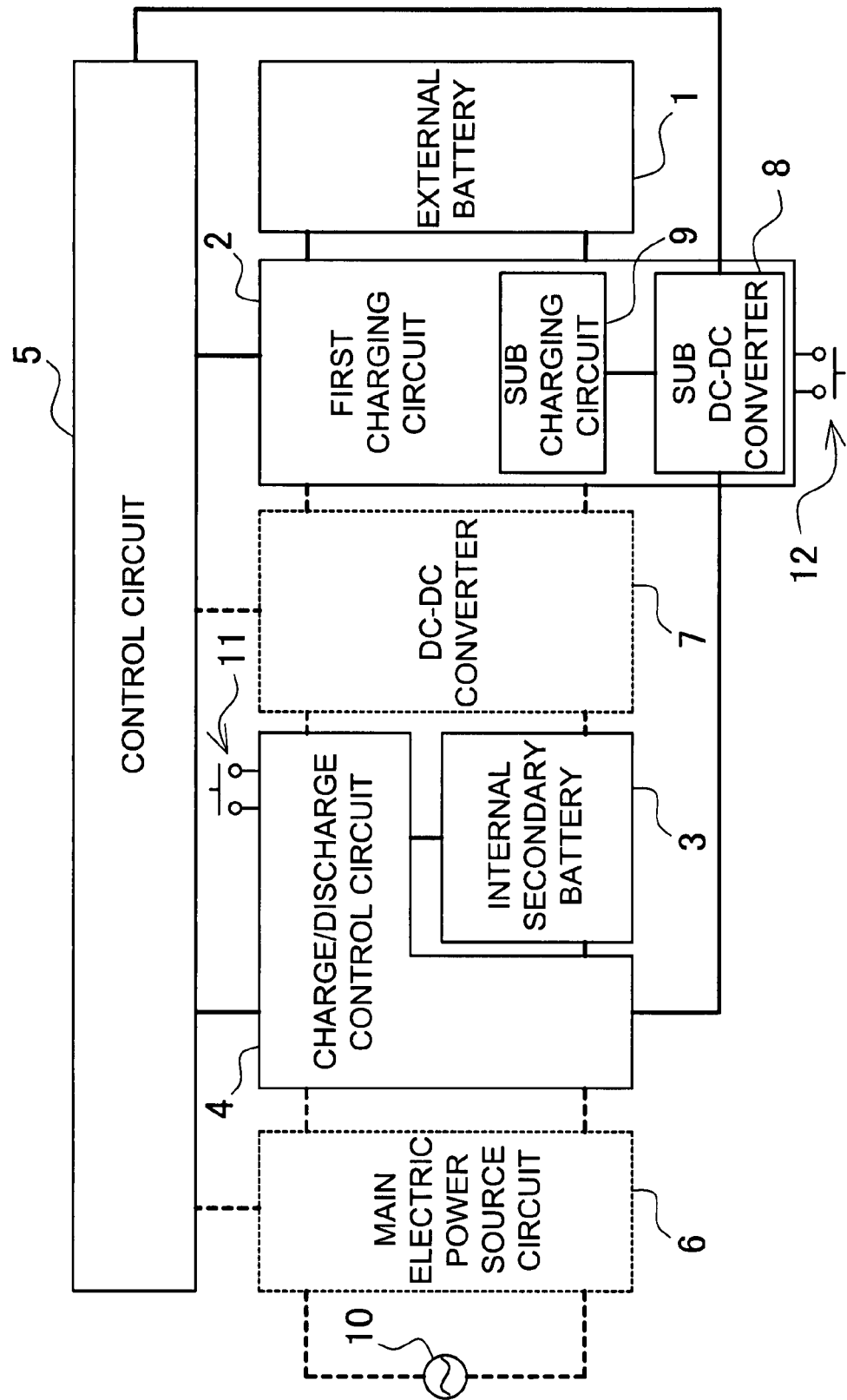
FIG. 15 is a view showing a fifth operative state of the battery charger shown in FIG. 8.

FIG. 15 shows the state where the internal secondary battery 3 is charged by the external battery 1. The control circuit 5 detects that the external battery 1 has a residual capacity for charging the lithium-ion secondary battery which is the internal secondary battery 3 and also detects that the internal secondary battery 3 is not fully charged, and thus the internal secondary battery 3 is charged by the external battery 1. In the case where the internal secondary battery 3 is charged by the external battery 1, the first charging circuit 2 is provided with a sub charging circuit 9 for charging the lithium-ion secondary battery which is the internal secondary battery 3. Further, a sub DC-DC converter 8 is also provided for converting the output voltage from the external battery 1 to the output voltage from the lithium-ion secondary battery which is the internal secondary battery 3. Since the battery charger is to be used for charging the external battery 1, the sub charging circuit 9 is provided with a discharge switch 12 which permits the external battery 1 to be charged, and when the discharge switch 12 is detected to have been operated, the internal secondary battery 3 is charged by the external battery 1. A user of the battery charger operates the discharge switch 12 when the external battery 1 need not be used, and thus the internal battery 3 is charged by the external battery 1.

It should be apparent to those of ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the spirit and scope of the invention as defined in the appended claims.

The present application is based on Application No. 2006-219015 filed in Japan on Aug. 10, 2006, the content of which is incorporated herein by reference.

What is claimed is:

1. A battery charger comprising:
a first charging circuit for controlling input power to charge an external battery which is detachably mounted to the battery charger;
an internal secondary battery which can be charged by the input power;
a charge/discharge control circuit for charging the internal secondary battery by the input power and controlling a discharge of the internal secondary battery; and
a control circuit for controlling an operative state of the first charging circuit and the charge/discharge control circuit,
wherein the battery charger serves to charge the detachably mounted external battery by means of the input power as well as by means of the internal secondary battery,
wherein the battery charger is so constructed and arranged that when the input power is not in a state of being inputted to the battery charger, the control circuit supplies electric power from the internal secondary battery to the charge/discharge control circuit in an operative state, so that the charge/discharge control circuit in its operative state controls a discharging state of the internal secondary battery, and thus the internal secondary battery is discharged, so that the external battery is charged by using the discharged electric power from the internal secondary battery, and
wherein the charge/discharge control circuit includes a charge switch for controlling charging of the external battery with the internal secondary battery, the charge switch being manually selectable between ON and OFF when the external battery is mounted to the battery charger.

2. The battery charger as recited in claim 1, further comprising a DC-DC converter for converting an output voltage from the internal secondary battery.

3. The battery charger as recited in claim 1, further comprising a main electric power source circuit for outputting a DC voltage for charging the external battery, wherein the main electric power source circuit uses an input power from a commercial power supply.

4. The battery charger as recited in claim 1, wherein the first charge circuit is provided with a sub charging circuit for charging the internal secondary battery by supplying the electric power to the internal secondary battery from the external battery, so that the sub charging circuit enables the internal secondary battery to be charged from the external battery.

5. The battery charger as recited in claim 1, further comprising a main electric power source circuit for outputting the DC voltage for charging the external battery, wherein the main electric power source circuit is an AC adaptor.

6. The battery charger as recited in claim 1, further comprising a main electric power source circuit for outputting the DC voltage for charging the external battery, wherein the main electric power source circuit is a solar battery.

7. The battery charger as recited in claim 1, wherein the internal secondary battery is a lithium-ion secondary battery.

8. The battery charger as recited in claim 1, further comprising a casing, wherein a mounting portion for detachably mounting a mobile electronic device is provided on an upper face of the casing, and wherein in a state where the mobile electronic device is mounted on the mounting portion, the battery charger serves to charge an external battery which is a secondary battery built in the mobile electric device.

9. The battery charger as recited in claim 1, wherein the external battery is used as a secondary battery incorporated in a battery pack which is detachably mounted to the mobile electronic device.

10. The battery charger as recited in claim 1, wherein the external battery is one selected from the group consisting of a lithium-ion secondary battery, a nickel-hydrogen battery and a nickel-cadmium battery.

11. The battery charger as recited in claim 1, wherein the control circuit is supplied with electric power from the internal secondary battery in order to control charging of the external battery with power from the internal secondary battery under a condition where no input power is supplied to the battery charger.

12. The battery charger as recited in claim 1, wherein the control circuit is operable to detect a residual capacity of the internal secondary battery, and to make the charge/discharge control circuit inoperative when the detected residual capacity of the internal secondary battery is smaller than a set capacity for charging the external battery.

13. A battery charger comprising:
a first charging circuit for controlling input power to charge an external battery which is detachably mounted to the battery charger;
an internal secondary battery which can be charged by the input power;
a charge/discharge control circuit for charging the internal secondary battery by the input power and controlling a discharge of the internal secondary battery; and
a control circuit for controlling an operative state of the first charging circuit and the charge/discharge control circuit,
wherein the battery charger serves to charge the detachably mounted external battery by means of the input power as well as by means of electric power from the internal secondary battery,
wherein the battery charger is so constructed and arranged that when the input power is not being inputted to the battery charger, the control circuit supplies electric power from the internal secondary battery to the charge/discharge control circuit so that the charge/discharge control circuit in an operative state thereof controls a discharging state of the internal secondary battery, and thus the internal secondary battery is discharged so that the external battery is charged by using the discharged electric power, and
wherein the first charge circuit is provided with a sub charging circuit for charging the internal secondary battery by supplying electric power to the internal secondary battery from the external battery so that the sub charging circuit enables the internal secondary battery to be charged by the external battery.

* * * * *